Patented Aug. 25, 1925.

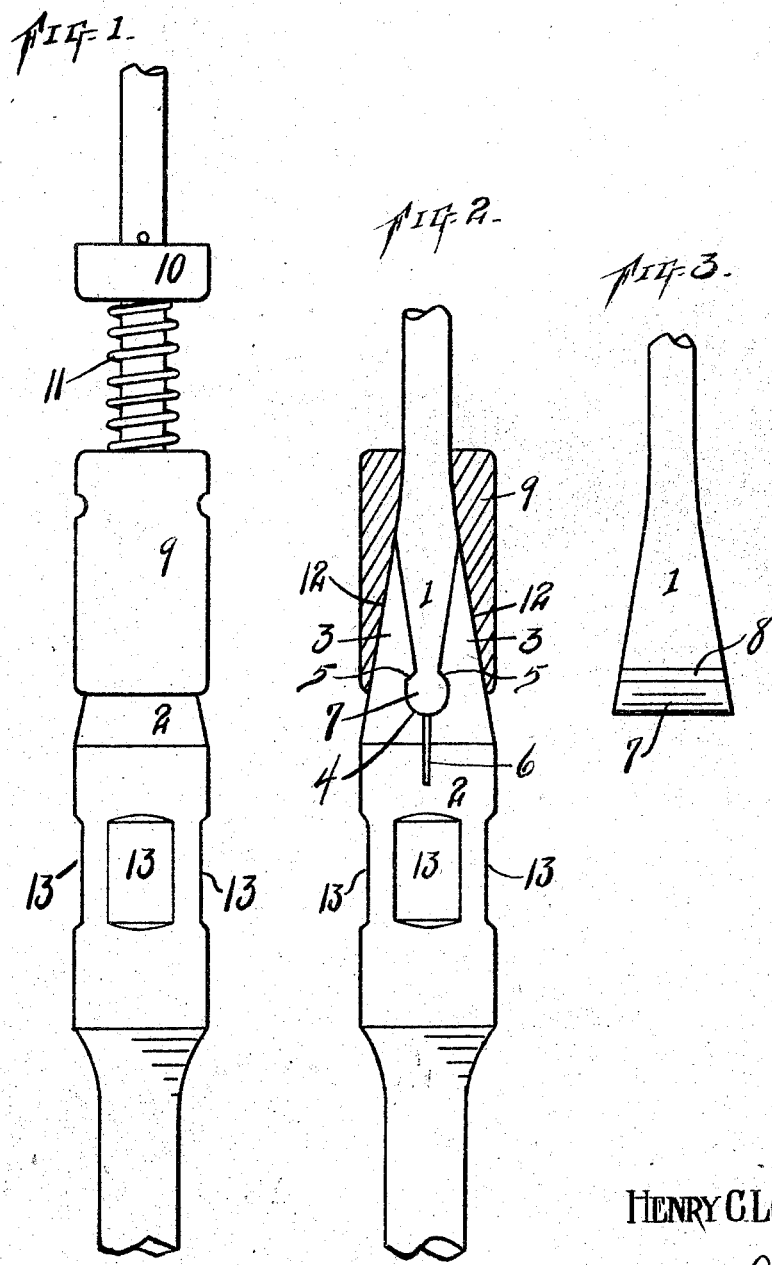

UNITED STATES PATENT OFFICE.

HENRY C. LONSDALE, OF RANGER, TEXAS.

COUPLING FOR SUCKER RODS AND THE LIKE.

Application filed May 9, 1925. Serial No. 29,046.

*To all whom it may concern:*

Be it known that I, HENRY C. LONSDALE, a citizen of the United States, residing at Ranger, in the county of Eastland and State of Texas, have invented certain new and useful Improvements in Couplings for Sucker Rods and the like, of which the following is a specification.

My invention relates to rod couplings and particularly to rod couplings or sucker rod couplings for deep wells; and the object is to provide a safety coupling for rods under great strain and which will not become disengaged under severe service and which can be easily coupled and which will be strong and durable and which will be automatically coupled. Other objects and advantages will be fully explained in the following description and the invention will be more particularly pointed out in the claims.

Reference is had to the accompanying drawings which form a part of this application.

Fig. 1 is a side elevation of a coupling for a sucker rod. Fig. 2 is a vertical section of the holding sleeve, illustrating the manner in which the coupling is locked and held locked. Fig. 3 is a side elevation of the male member of the coupling.

Similar characters of reference are used to indicate the same parts throughout the several views.

The upper part of the sucker rod carries the male member 1 of the coupling and the lower member of the sucker rod carries the female member 2 of the coupling. The female member has two flared spring steel jaws 3. The jaws 3 converge by relatively long inclines down to a curved opening 4 which has beveled walls 5 at the upper side. The member has a slot 6 extended some distance below the curved opening 4 for the purpose of making the jaws 3 yielding. It is apparent that the longer the slot 6 is, the more yielding will the jaws 3 be. The male member 1 terminates with an enlarged transverse rib 7 which conforms in contour to the opening 4 in the female member and has inclined shoulders 8. The effect of the inclined walls 5 and the inclined shoulders 8 is wedging to make the parts fit snugly together. The coupling members are held locked together by a spring-actuated sleeve 9. A collar 10 is fixedly attached to the sucker rod and a spiral spring 11 is mounted on the sucker rod between the collar 10 and the sleeve 9. The spring causes the collar to press down on the outside inclined surfaces 12 of the jaws 3 and so makes a rigid coupling. The lower part of the sucker rod forms the male member 1 which is cone-shaped. The female member 2 with the jaws 3 is generally cone-shaped on the outside and has a flared shape inside the jaws 3 to make the coupling of the parts easily accomplished. The part 7 will snap into the opening 4 after sliding down the inclines of the inside of the jaws 3. The jaws 3 will be sprung open sufficiently to let the enlarged rib 7 pass down into the opening 4. The collar 9 will then press down on the jaws 12 and so prevent the jaws from spreading to let the rib 7 pass outwardly. There will be no danger of the parts becoming uncoupled because the weight of the column of water or oil on top of the collar 9 will make the collar 9 hold stronger.

To uncouple the parts, raise the collar 9 until its lower edge passes above the jaws 3. Then shift the part 7 laterally out of the opening 4. The member 2 has flat portions 13 for an engaging tool or wrench or grab and the collar 9 has cut-outs 14 for an engaging tool.

What I claim, is,—

1. A rod coupling comprising a female member having jaws forming a converging throat and having a curved cavity at the termination of the jaws and a male member having tapering sides and a bead at the lower edge and occupying said cavity and a spring-actuated sleeve for locking said bead in said cavity.

2. A rod coupling comprising a female member having jaws forming a converging throat and having a curved cavity at the termination of said jaws and a male member having tapering sides and a bead at the lower edge and occupying said cavity, a collar on said male member, a sleeve for locking said bead in said cavity, and a spring on said rod between said collar and sleeve for bearing down on said sleeve.

3. A rod coupling comprising a female member having jaws forming a converging throat and having a curved cavity at the termination of said jaws and having a slot below said cavity for making said jaws yielding, a male member having a wedge shape occupying said throat and having a bead occupying said cavity, the upper wall of said cavity being inclined on both sides and the upper side of said bead being inclined to conform to the shape of said cavity, and a spring-actuated sleeve for locking said male and female together.

4. A rod coupling comprising a female member having jaws forming a converging throat and having a curved cavity at the termination of said jaws and having a slot below said cavity for making said jaws yielding, said jaws being substantially cone-shaped on the outside, a male member having a wedge shape terminating with a bead to be snapped into said cavity, a sleeve having a funnel-shaped opening for engaging said male and female members, a collar on said male member, and a spring mounted on said male member between said collar and said sleeve for bearing down on said sleeve.

In testimony whereof, I set my hand, this 24th day of April, 1925.

HENRY C. LONSDALE.